United States Patent
Hewinson

(10) Patent No.: US 9,082,136 B1
(45) Date of Patent: Jul. 14, 2015

(54) SYSTEM AND METHOD FOR CONFIGURING CONTENT PRESENTATION BASED ON DEVICE PROXIMITY AND USER CHARACTERISTICS

(71) Applicant: Google Inc., Mountain View, CA (US)

(72) Inventor: Philip Hewinson, London (GB)

(73) Assignee: GOOGLE INC., Mountain View, CA (US)

(*) Notice: Subject to any disclaimer, the term of this patent is extended or adjusted under 35 U.S.C. 154(b) by 212 days.

(21) Appl. No.: 13/644,061

(22) Filed: Oct. 3, 2012

(51) Int. Cl.
*G06Q 30/00* (2012.01)
*G06Q 30/02* (2012.01)

(52) U.S. Cl.
CPC ........ *G06Q 30/0267* (2013.01); *G06Q 30/0269* (2013.01)

(58) Field of Classification Search
CPC .................................................. G06Q 30/0267
USPC ....................................................... 705/14.64
See application file for complete search history.

(56) References Cited

U.S. PATENT DOCUMENTS

| 7,062,469 | B2 | 6/2006 | Meyers | |
| 7,853,474 | B2* | 12/2010 | Ullah | 705/7.31 |
| 2006/0059044 | A1 | 3/2006 | Chan et al. | |
| 2006/0085310 | A1* | 4/2006 | Mylet et al. | 705/35 |
| 2008/0140509 | A1 | 6/2008 | Amjadi | |
| 2011/0016006 | A1* | 1/2011 | Opdycke | 705/14.73 |

* cited by examiner

*Primary Examiner* — John G Weiss
*Assistant Examiner* — Scott C Anderson
(74) *Attorney, Agent, or Firm* — Leason Ellis LLP

(57) ABSTRACT

This specification describes technologies relating to content presentation. In general, one aspect of the subject matter described in this specification can be embodied in methods that include the actions of receiving one or more respective identifiers, each being associated with a respective device, determining respective proximities of the to a content presentation medium, processing the identifiers to determine one or more characteristics that pertain to users of the one or more devices, selecting third party content items based on the characteristics, configuring the third party content items for presentation at the content presentation medium based on (a) the proximities of the devices to the content presentation medium and (b) the characteristics, and presenting the third party content items at the content presentation medium. Other embodiments of the various aspects include corresponding systems, apparatus, and computer program products.

23 Claims, 9 Drawing Sheets

SYSTEM AND METHOD FOR CONFIGURING CONTENT PRESENTATION BASED ON DEVICE PROXIMITY AND USER CHARACTERISTICS

BACKGROUND

The present disclosure relates to content presentation.

Content providers provide content in different forms in order to attract consumers. Such content is designed to be used in whole or part by a user, for example, a particular consumer. Additionally, such content can be provided in electronic form. For example, such content can be provided on a web page, together with search results, or within a mobile application.

SUMMARY

This specification describes technologies relating to content presentation.

In general, one aspect of the subject matter described in this specification can be embodied in methods for providing third party content. The method includes the actions of receiving one or more respective identifiers, each respective identifier being associated with a respective one of one or more devices, determining one or more respective proximities of the one or more devices to a content presentation medium, processing, with a processor executing code, the one or more respective identifiers to determine one or more characteristics, the one or more characteristics pertaining to one or more users of the one or more devices, selecting, based on the one or more characteristics, one or more third party content items, configuring, based on (a) the respective proximities of the one or more devices to the content presentation medium and (b) the one or more characteristics, the one or more third party content items for presentation at the content presentation medium, and presenting the one or more third party content items at the content presentation medium.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

By way of overview and introduction, content can be presented to multiple users simultaneously though various content presentation mediums such as display screens (e.g., LCD/LED screens, etc.). Third part content providers, such as advertisers, can utilize such content presentation mediums to present third party content items, such as advertisements to users, such as those users that are capable of viewing a particular content presentation medium.

In an effort to improve the ability of third party content providers, such as advertisers, to present third party content items, such as advertisements, using such content presentation mediums, information (e.g., characteristics such as demographic information, user interests, etc.) pertaining to users that are within certain proximity of a content presentation medium, and such respective proximities can be perceived, identified, and/or determined. In doing so, more effective advertisements can be selected (e.g., advertisements that appeal to interests shared by a number of users that are presently within a certain proximity to a content presentation medium), and such advertisements can be further configured/formatted in a manner that accounts for characteristics of various users and/or their respective proximities to the content presentation medium. It can be appreciated that, in doing so, third party content providers such as advertisers can provide content, such as advertisements, in a manner that more effectively accounts for characteristics of various users, as well as the proximity of such users to the medium on which such advertisements are presented.

While reference will be made below to advertising systems and processes, other forms of content including other forms of sponsored content can be managed and presented in accordance with the description below.

Figure 1:
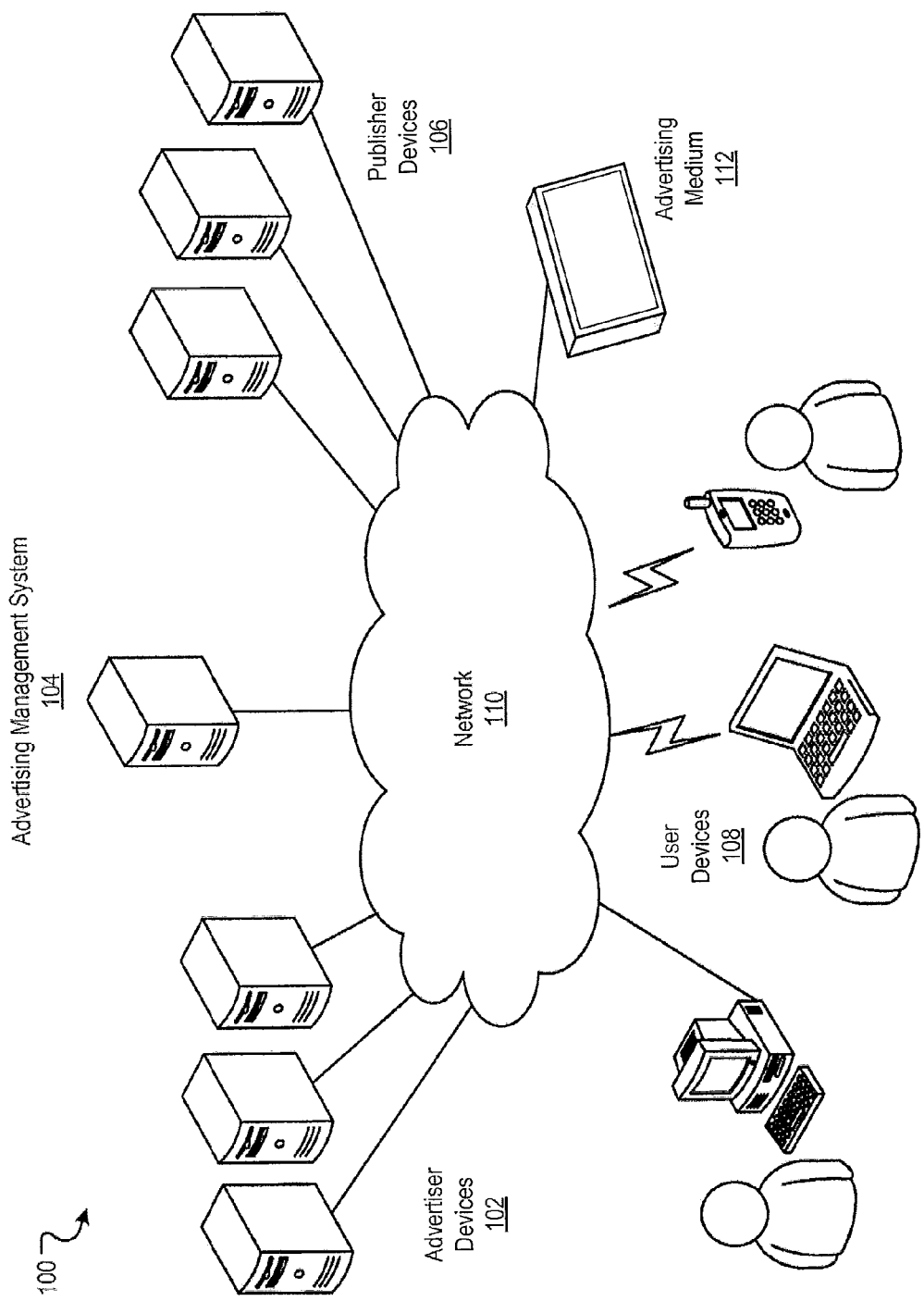
FIG. 1 is a diagram of an example content presentation system.

FIG. 1 is a block diagram showing an example content presentation system 100. In some implementations, one or more third party content providers such as advertisers, using advertiser devices 102, can directly, or indirectly, enter, maintain, and log third party content information such as ad information in a content management system such as advertising management system 104. Though reference is made to advertising, other forms of content, including other forms of sponsored content, can be delivered by the system 100. The ads can be in the form of graphical ads, such as banner ads, text-only ads, image ads, audio ads, video ads, media ads, interactive ads, ads combining one or more of any of such components, etc. The ads can also include embedded information, such as links, meta-information, and/or machine executable instructions.

One or more first party content providers such as publishers, using publisher devices 106, can submit requests for third party content items such as ads to the system 104. The system 104 responds by sending third party content items to the requesting publisher device 106 for placement on, or association with, one or more of the publisher's content items (e.g., web properties such as web pages). It should also be understood that in certain implementations, third party content items such as ads can be provided in a substantially similar manner in television and radio content slots (such as advertising slots), and/or print media space.

Other entities, such as users, using user devices 108, and third party content providers such as the advertisers, using advertiser devices 102, can provide usage information to the system 104, such as, for example, whether or not a conversion (e.g., a purchase or other interaction including, for example, a request for driving directions to a location associated with a third party content item such as an ad, navigating to the location associated with a third party content item such as the ad, or walking to the location associated with a third party content item such as the ad) or a click-through related to a third party content item such as an ad (e.g., a user has selected a third party content item such as an ad) has occurred. This usage information can include measured or observed user behavior related to third party content items such as ads that have been served. In some cases, a user may enable and/or disable the recording or observation of such usage information. In some cases, identifiers associated with each user may be anonymized so that the identity of each user is not provided to a third party content provider such as the advertiser. The system 104 can perform financial transactions, for example, crediting first party content providers such as the publishers 106 and charging third party content providers such as the advertisers 102 based on the usage information.

In certain implementations, a content presentation/delivery medium such as advertising medium 112 can provide a setting where first party content (such as that originating at one or more publishers) and/or third party content (such as that originating at one or more advertisers, e.g., ads) can be displayed, projected, and/or otherwise disseminated. Examples of such advertising media 112 include LCD/LED display screens (or any other such screen or medium capable of depicting one or more advertisements, such as a billboard or sign) and loudspeakers/sound projection devices (capable of projecting audio advertisements). It should be noted that, in certain implementations, advertising medium 112 can be equipped with and/or otherwise in communication with any number of communications components and/or devices (not shown) that can enable the perception of and/or communication with user devices 108A-F by advertising medium 112.

A network 110, such as a local area network (LAN), wide area network (WAN), the Internet, one or more telephony networks or a combination thereof, connects advertiser devices 102, the system 104, publisher devices 106, user devices 108, and advertising medium 112.

One example publisher device 106 is a general content server that receives requests for first party content (e.g., articles, discussion threads, music, video, graphics, search results, web page listings, information feeds, etc.), and retrieves the requested first party content in response to the request. The content server can submit a request for third party content such as ads to a content server such as an advertisement server in the system 104. The third party content item request can include a number of third party content items such as ads desired. The third party content item request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested first party content with one or more of the third party content items such as ads provided by the system 104. The combined first party content and third party content items such as ads can be sent/rendered to the user devices 108 that requested the content for presentation in a viewer (e.g., a browser or other content display system). The content server can transmit information about the third party content items such as ads back to the content server, including information describing how, when, and/or where the third party content items such as ads are to be rendered (e.g., in HTML or JavaScript™). Alternatively, in certain implementations the first party content and/or the third party content items such as ads can be sent/rendered to and advertising medium 112 (e.g., a digital display screen) for presentation thereon.

Another example publisher device 106 is a server that provides a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for third party content items such as ads to the system 104. The request can include a number of third party content items desired. This number can depend on the search results, the amount of screen or page space occupied by the search results, the size and shape of the third party content items, and/or a variety of other factors. In some implementations, the number of desired third party content items will be from one to ten, or from three to five. The request for third party content items can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the content management system 104 includes an auction process to select third party content items such as ads from the third party content providers such as advertisers. For example, third party content providers such as the advertisers can be permitted to select, or bid, an amount they are willing to pay for each presentation of or interaction with (e.g., click of) a third party content item, e.g., a cost-per-click amount a third party content provider pays when, for example, a user clicks on a third party content item. The cost-per-click can include a maximum cost-per-click, e.g., the maximum amount the third party content provider is willing to pay for each click of an third party content item based on a keyword, e.g., a word or words in a query. Other bid types, however, can also be used. Based on these bids, third party content items can be selected and ranked for presentation.

The search service can combine the search results with one or more of the third party content items provided by the system 104. This combined information can then be forwarded to the user devices 108 that requested the content. The search results can be maintained as distinct from the third party content items, so as not to confuse the user between paid third party content items and presumably neutral search results.

In some implementations, one or more publisher devices 106 can submit requests for third party content items such as ads to a content management system such as advertising management system 104. The system 104 responds by sending third party content items to the publisher device 106 for placement on one or more of the publisher's web properties (e.g., websites and other network-distributed content) that are relevant to the web property. For example, if a publisher device 106 publishes a sports-related web site, the advertising management system can provide sports-related ads to the publisher device 106. In some implementations, the requests can instead be executed by devices associated with the user 108, e.g., by the execution of a particular script when the publisher's web page is loading on a client device.

In some alternative implementations, an ad push model is used to provide third party content items such as ads from third party content providers such as advertisers. In an ad push model, ads can be pushed to idle screens (e.g., of a mobile devices or particular applications) based on particular criteria (e.g., the user's location).

In another example the referenced publisher can be a mobile application developer. A mobile application is an application specifically designed for operation on a mobile device (e.g., a smart phone). The mobile application can also include ads positioned within the content of the mobile application. Similar to publishers, the ads can be received from the system 104 for placement in the mobile application when accessed by a user device (e.g., when a particular page of a mobile application is loaded on the mobile device).

In some implementations, one or more content presentation mediums, such as advertising medium 112 can submit requests to a content management system such as advertising management system 104 for third party content items such as ads. The system 104 responds by sending third party content items to the advertising medium 112 for placement/display thereon. Alternatively, in certain implementations advertising medium 112 can store multiple ads, and advertising management system 104 can provide instructions regarding which ads should be displayed on the advertising medium 112, and under what circumstances such ads should be displayed.

For situations in which the systems discussed here collect personal information about users, the users may be provided with an opportunity to control the manner such information is collected with respect to programs or features that may collect personal information (e.g., information about a user's preferences or a user's current location). Users may also be informed of the accompanying limitations on the functionality of a service that may result from limiting access to such personal information. In addition, certain data may be anonymized in one or more ways before it is stored or used, so that personally identifiable information is removed. For example, a device identifier associated with a user's identity may be anonymized so that no personally identifiable information can be determined for the user, or a user's geographic location may be generalized where location information is obtained (such as to a city, zip code, or state level), so that a particular location of a user cannot be determined.

Figure 2:
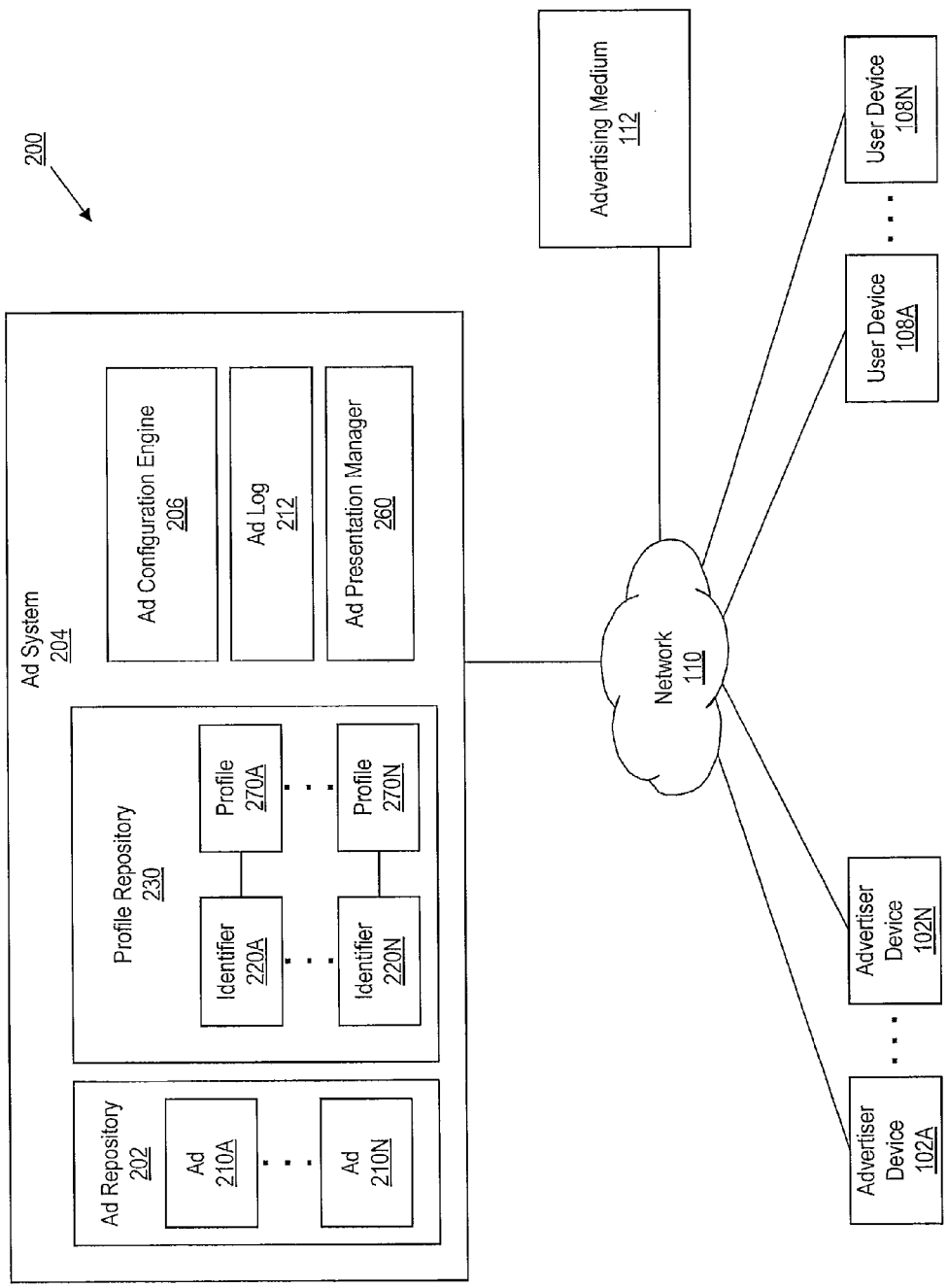
FIG. 2 is a block diagram of an example system for providing third party content.

FIG. 2 is a block diagram of an example system 200 for providing third party content. In the system 200, a third party content provider such as advertiser, using advertiser devices 102A-102N (referred to collectively as advertiser devices 102) can submit one or more third party content items such as ads 210A-210N (also known as "creatives") (referred to collectively as ads 210) to an ad system 204, and such ads 210 are stored in a third party content repository such as an ad repository 202. Each ad (e.g., ad 210A) includes one or more words, phrases, web links, and/or any other such element and/or component (e.g., images, video, audio, etc.) that are provided to one or more user devices 108 (e.g., banner ads, text-only ads, image ads, audio ads, video ads, etc.) and/or to advertising medium 112. In certain implementations, one or more keywords (not shown) are associated with one or more creatives in order to enable the identification and selection of pertinent ads for display to a user based on one or more search queries received from the user. It should also be noted that although ads 210 are described herein as referring to individual ads, in certain implementations ads 210 can refer to groups of ads, such as ad groups, campaigns, and/or categories.

Ad system 204 can also include an ad presentation manager 260. The ad presentation manager 260 can identify ads in the ad repository 202 to present at advertising medium 112 and/or to a user device 108, for example based on various criteria such as keywords in a search query, web page content, context, location, ad financials (e.g., cost per impression). For example, ad presentation manager 260 can identify one or more ads 210 associated with one or more characteristics of various users that are within a certain proximity of advertising medium, and such creatives can be provided at advertising medium 112 as described in greater detail herein. By way of further example, ad presentation manager 260 can identify one or more ads 210 associated with one or more keywords that are similar and/or identical to the search query provided by the user, and such creatives can be provided to the user in any number of ad formats. It should be understood that in some implementations, the ad system 204 can interact with a search system, for example presenting ads alongside search results. In some implementations, the ad system 204 can interact with content publishers, for example, providing ads to publishers or users for presentation along with web content, e-mail, or other content.

Ad system 204 can also include one or more ad logs 212. In certain implementations, ad log 212 can maintain ad display histories, which maintains a record of the various instances of the display of respective ads to respective users. Moreover, in certain implementations ad log 212 can maintain a record of one or more ad performance metrics 220 that reflect the performance or success of a particular third party content item such as an ad. For example, for a given ad, ad log 212 can maintain a record of the 'click through rate' (CTR), reflecting the percentage of users presented with an ad that click on or otherwise select the presented content, though it should be understood that any number of other performance metrics can be similarly tracked (e.g., conversion rate), as is known to those of ordinary skill in the art.

Ad system 204 can also include a profile repository 230 that stores one or more profiles 270A-270N (referred to collectively as profiles 270) such as user profiles. Such profiles 270 can reflect one or more characteristics of a user and/or of a particular type of or group of users, such as demographic information, interests, preferences, etc. Moreover, such profiles can be associated with and/or otherwise linked to one (or more) identifiers 220A-220N (referred to collectively as profiles 270), which can correspond to items such as SSIDs, MAC addresses, etc., as described in greater detail herein. It should be noted that in situations where personal or identifying information is collected, users may be provided with the ability to control whether such information is collected, the extent to which such information is collected, and/or the extent to which a user can be identified based on it. For example, a user can select an option whereby any personal or identifying information is immediately aggregated with that of other users such that such information cannot subsequently be associated with or otherwise identify the individual user.

At this juncture it should be noted that while FIG. 2 depicts ad repository 202 within ad system 204, in alternate implementations ad repository 202 can be configured external to ad system 204, such as at advertising medium 112.

Additionally, ad system 204 can include ad configuration engine 206. The ad configuration engine 206 can select one or more third party content items, such as ads 210, and can configure such ads for presentation, such as on an advertising medium 112, based on respective characteristics of users that are within a certain proximity to the advertising medium 112, and/or characteristics of such users, as described in detail herein. It should also be understood that in some implementations ad configuration engine 206 can include one or more processors configured by code to implement the functionality of the ad configuration engine that is being described.

Figure 3:
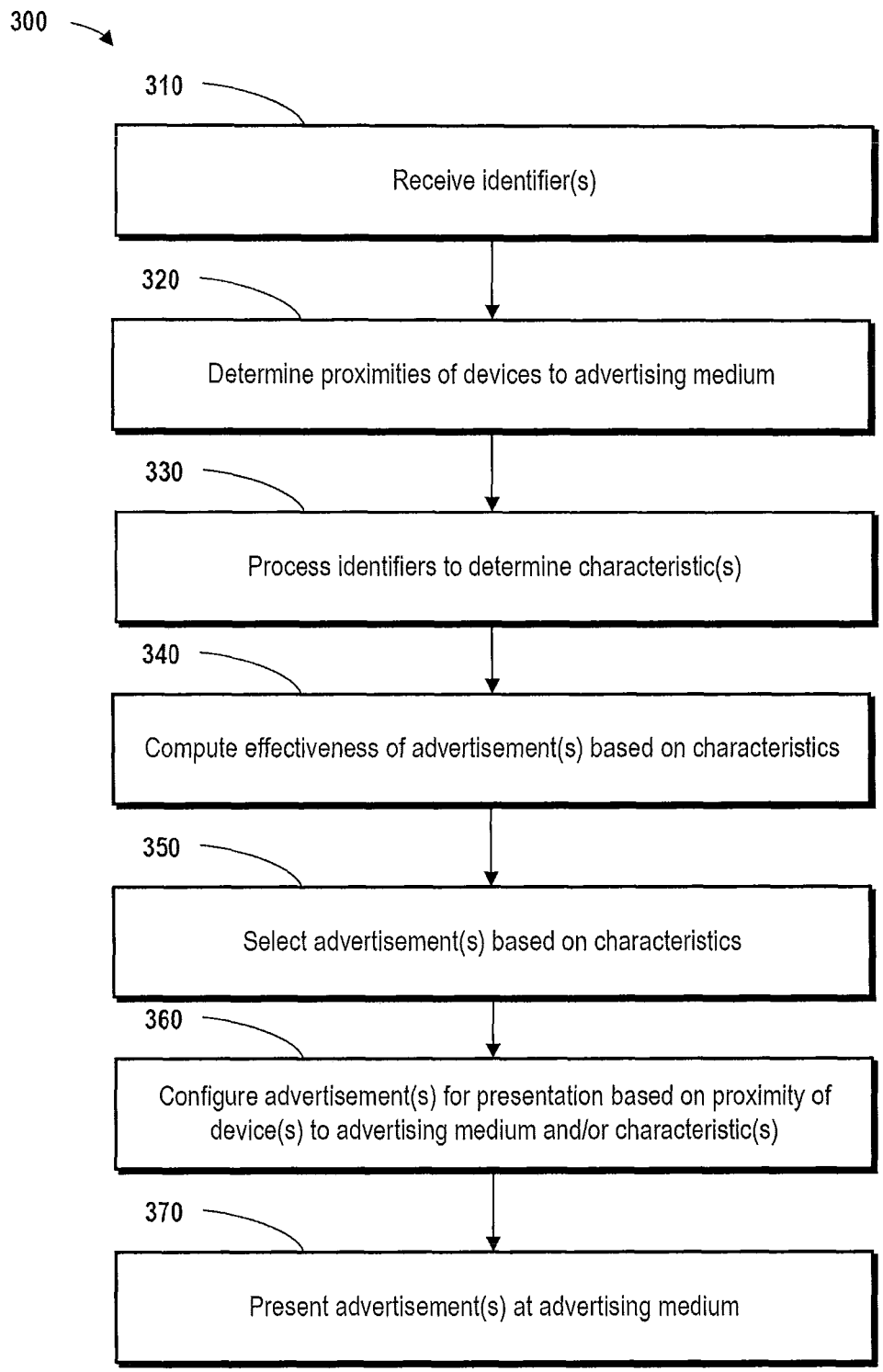
FIG. 3 is a flow chart of an example process for providing third party content.

FIG. 3 is a flowchart of an example method 300 for providing third party content. In some implementations, the method 300 can be performed by a processor executing instructions in a computer-readable storage medium. For example, the method 300 can be performed by the ad system 204 of FIG. 2.

Figure 4:
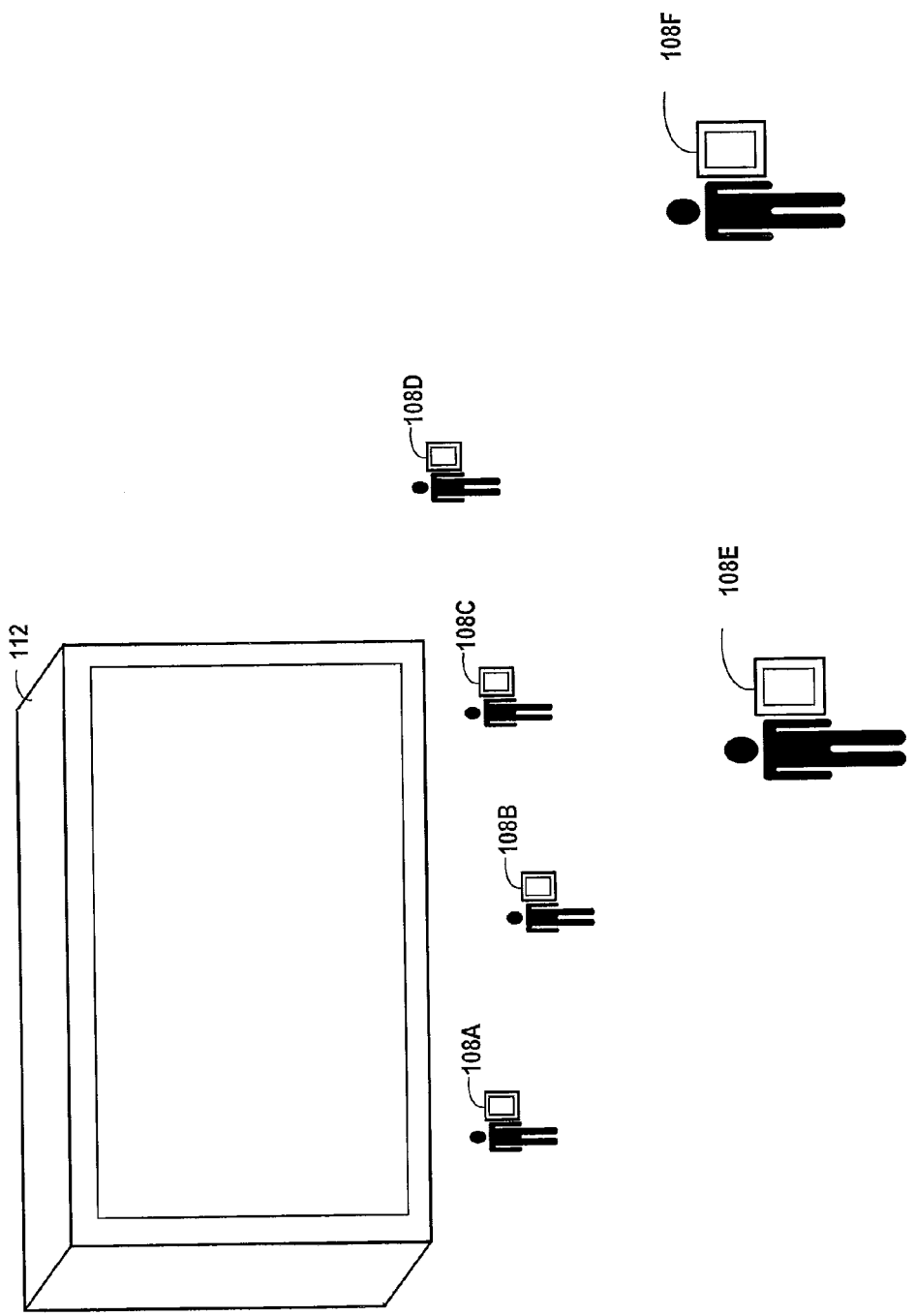
FIG. 4 depicts a content presentation medium, as well as various users, each of which is holding a respective user device.

One or more identifiers are received (310). In certain implementations, each respective identifier is associated with a respective device, such as a user device 108. By way of illustration, FIG. 4 depicts an advertising medium 112 (e.g., a digital display screen), as well as various users, each of which is holding (or otherwise in possession of) a respective user device 108A-F (e.g., a smart phone). In certain implementations, advertising medium 112 can perceive and/or communicate with user devices 108A-F. By way of example, in certain implementations respective service set identifiers (SSIDs) can be broadcasted by user devices 108 and received by advertising medium 112, while in other implementations identifiers such as media access control (MAC) addresses, Bluetooth identifiers, near-field communications (NFC) identifiers, and/or GPS coordinates can be broadcasted/transmitted by user devices and received by advertising medium 112. It should be further understood that, in certain implementations, each respective identifier can correspond to and/or be associated with a respective user profile 270. Moreover, in certain implementations, such identifiers (e.g., respective SSIDs of each user device) can be generated/assigned to reflect various characteristics of the user of the device. For example, an SSID nomenclature can be implemented whereby numeric and/or alphanumeric elements (e.g., letters and numbers) can reflect various characteristics of the user of the device. By way of illustration, each letter/number in the SSID "R4X59" can correspond to a particular characteristic of the user (e.g., "R" can correspond to an interest in sports, "4" can correspond to the language the user speaks, etc.). Accordingly, upon perceiving such an SSID, advertising medium 112 can identify various characteristics of the user of the device, as described in greater detail herein. It should be noted, however, that, to the extent that the referenced identifiers pertain to personal or identifying information, users may be provided with the ability to control whether such information is collected or otherwise utilized, the extent to which such information is collected/utilized, and/or the extent to which a user can be identified based on such information. For example, a user can select an option whereby any personal or identifying information (such as that reflected in an identifier such as an SSID) is immediately aggregated with that of other users such that such information cannot subsequently be associated with or otherwise used to identify an individual user.

Respective proximities of the one or more devices to a content presentation medium are determined (320). That is, it can be further appreciated with reference to FIG. 4 that each of the various user devices 108 are situated within varying degrees of proximity to advertising medium 112. For example, user devices 108A-D are in relatively closer proximity to advertising medium 112, while user devices 108E-F are relatively further away. In certain implementations, such respective proximities to the content presentation medium can be determined based on the respective signal strengths associated with each of the identifiers (e.g., SSIDs, MAC addresses, etc., as referenced above) as received at the advertising medium 112, such as in a manner known to those of ordinary skill in the art. In other implementations, such respective proximities to the content presentation medium can be determined based on a comparison of location information (e.g., GPS coordinates) associated with a respective device and corresponding location information for the advertising medium 112, such as in a manner known to those of ordinary skill in the art.

The respective identifiers are processed (330). That is, having received one or more identifiers (such as at 310), each of which correspond to a particular user device 108, each identifier can be processed in order to determine one or more characteristics such as characteristics pertaining to users of the respective devices. By way of further illustration, it can be appreciated that each identifier 220 (each of which corresponds to a particular user device 108) can be associated with a particular user profile 270. Such a user profile (e.g., a social networking profile, etc.) can reflect various characteristics of a user, such as various interests, demographic information, etc. Thus, by processing a respective identifier and/or its associated user profile, one or more characteristics can be determined, such as characteristics that pertain to users of the devices. For example, based on the processing of a particular identifier, a user profile can be identified, based upon which it can be determined that a particular user is a member of a particular demographic and has an interest in sports and video games. Moreover, having processed identifiers for multiple users, various characteristics that are shared by some, most, or all users can be identified (e.g., common interests, demographic information, etc.).

An effectiveness of the one or more third party content items is computed (340). That is, it can be appreciated that different third party content items, such as advertisements, can be determined to be more (or less) effective when presented to users who are among a certain demographic and/or that have particular interests. For example, certain products (e.g., beauty supplies, video games, sports, etc.) may be of greater interest to users having certain interests and/or that are among a certain demographic, and advertisers may wish to focus advertising resources specifically towards such groups. Moreover, even when advertising a product having broader/universal appeal (e.g., soft drinks), advertisers can frequently design multiple advertisements/advertising campaigns, each of which is designed to appeal to users that are among a particular demographic and/or that have particular interests (e.g., using different celebrity endorsers that may appeal to different types of users). Accordingly, various ads 210 (such as those stored within ad repository 202) can be processed together with various characteristics of a particular user or users (such as those characteristics determined at 330) in order to compute an effectiveness of a particular advertisement (or advertisements) with respect to the referenced characteristics. For example, having identified that several users share a characteristic of having an interest in video games, an effectiveness of an advertisement for video games is likely to be determined to be greater (with respect to such users) than an effectiveness of an advertisement for baby food.

Moreover, in certain implementations an effectiveness (with respect to one or more users) of a particular third party content item, such as an advertisement, can be computed based on characteristics pertaining to the manner in which users interact with or otherwise relate to advertisements presented in other contexts/mediums, such as advertisements presented within webpages. That is, it can be appreciated that users who regularly interact with (e.g., click on) online advertisements may show greater interest in advertisements presented in other mediums (e.g., on digital display screens), while users who rarely (or never) interact with online advertisements may show lesser interest in advertisements presented in other mediums. Accordingly, in light of such ad interaction characteristics, an ad that pertains to interests of those users who interact with other forms of advertising more frequently can be determined to be more effective (by virtue of the fact that such an ad is directed to the interests of users who are more receptive to advertising) than an ad that pertains to interests of users who interact with other forms of advertising less frequently.

By way of further example, an effectiveness of a particular advertisement (with respect to one or more users) can be computed based on ad display histories of respective users. That is, it can be appreciated that, in certain implementations, users who have already viewed a particular ad (irrespective of the medium on which the ad was presented), or that have viewed a particular ad a number of times, may be less receptive to viewing such an ad again (and thus, such an ad can be determined to be less effective, at least with respect to such users). Moreover, it can be appreciated that in other implementations, users who have already viewed a particular ad (e.g., an ad that is part of a series or sequence of ads) may be more receptive to viewing another ad, such as a related ad (and thus, such an ad can be determined to be more effective, at least with respect to such users). Accordingly, such ad display histories can be utilized to determine an effectiveness of displaying a particular ad to a particular user or group of users.

Third party content items are selected based on the one or more characteristics (350). For example, one or more third party content items, such as advertisements, that are focused towards users having one or more characteristics (such as those determined at 330) can be selected. By way of illustration, and with reference to FIG. 4, it can be appreciated that each respective user can have a set of his/her own characteristics (e.g., one user may be interested in sports and TV, another in movies and music, etc.). Accordingly, the various characteristics identified with respect to each of the various users can be processed, and, in doing so, common characteristics that are shared by multiple users can be identified (for example, by identifying that several users are in a particular demographic, and/or that several users are interested in action movies). In doing so, one or more ads can be selected that are focused toward such characteristics.

By way of further example, one or more third party content items, such as advertisements, can be selected based on an effectiveness, such as the effectiveness computed at 340. That is, it can be appreciated that a particular advertisement can be relatively more effective with respect to users having a certain characteristic, while relatively less effective with respect to users having another characteristic. Thus, for example, in a scenario where a number of user devices are within close proximity to an advertising medium, an advertisement that can be determined to be particularly effective to certain users can be selected in lieu of an advertisement determined to be less effective to such users. By way of further example, in a scenario where a number of user devices are within close proximity to an advertising medium, in lieu of presenting a particular advertisement that can be determined to be particularly effective to certain users (e.g., a minority of users), an advertisement having broader applicability can be selected, even if such advertisement may be relatively less effective (i.e., is not of particular interest to any of the users).

Figure 5:
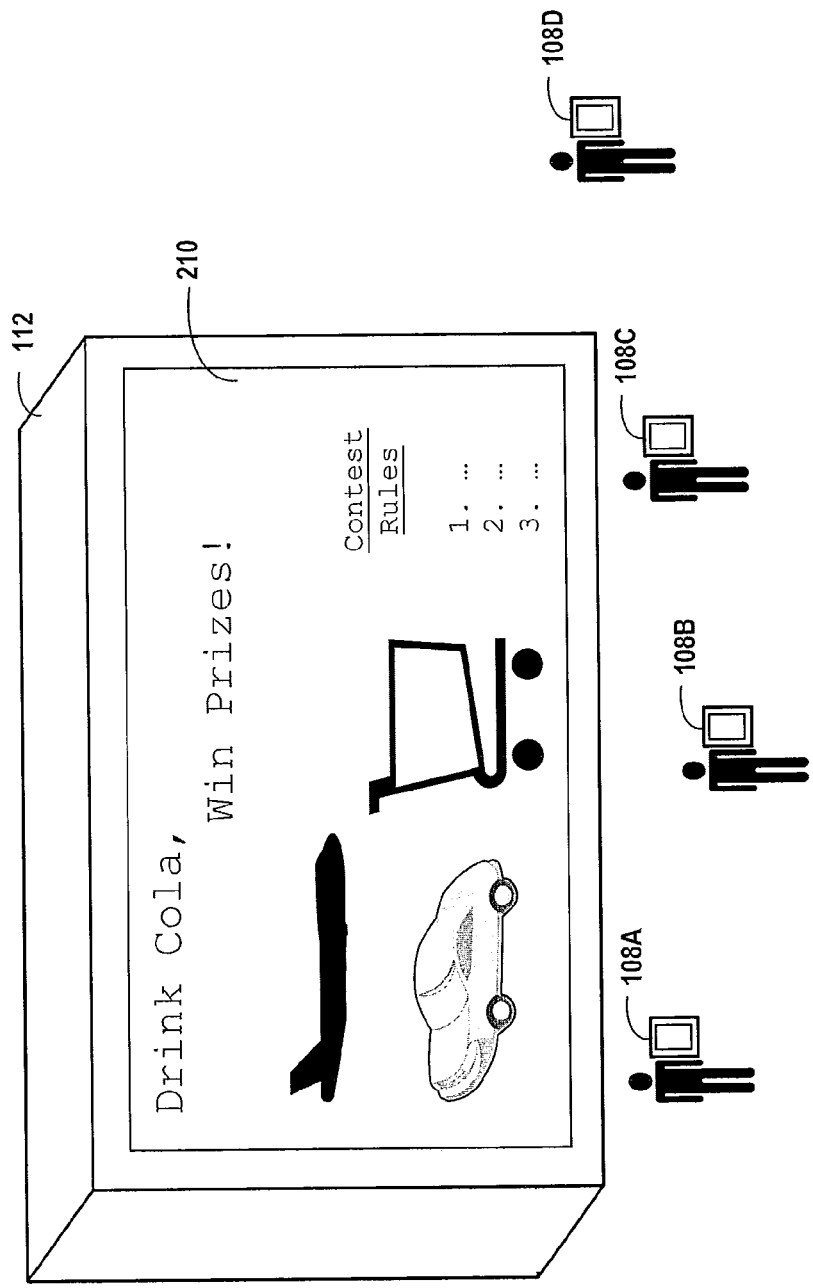
FIG. 5 depicts several users, each having a user device, present in relatively close proximity to a content presentation medium.

One or more third party content items are configured for presentation at the content presentation medium (360). That is, having selected a particular third party content item, such as an advertisement, for presentation at a content presentation medium, such as advertising medium 112 (such as in the manner described at 350), the selected advertisement can be further configured for presentation based on any number of factors. For example, in certain implementations, an advertisement can be configured for display at advertising medium 112 based on the respective proximities of the one or more user devices 108 to the advertising medium 112 (such as those determined at 320) and/or based on one or more characteristics (such as those determined at 330). That is, it can be appreciated that, in general, users positioned in relatively closer proximity to an advertising medium are more capable of viewing advertisements than users standing relatively further away. By way of illustration, FIG. 5 depicts the presence of several users, each having a user device 108, present in relatively close proximity to advertising medium 112. It can be appreciated that, in light of the relatively close proximity of the users to advertising medium 112, such users are likely to have a relatively easy time viewing/reading content presented at advertising medium 112. As such, the advertisement selected for presentation (such as in the manner described at 350), can be further configured/formatted to account for such proximity. For example, as shown in FIG. 5, the ad 210 selected for presentation ad advertising medium 112 can be formatted to account for the relatively close proximity of the various users—such as by reducing the font size used in the text of the ad, adding additional visual content (e.g., pictures), and/or adding additional content, such as additional text that can only be appreciated by users who are in relatively close proximity to advertising medium 112. It should be noted, however, that, to the extent that the referenced characteristics (with respect to which an advertisement can be configured) pertain to personal or identifying information, users may be provided with the ability to control whether such information is collected or otherwise utilized, the extent to which such information is collected/utilized, and/or the extent to which a user can be identified based on such information. For example, a user can select an option whereby any personal or identifying characteristics are immediately aggregated with that of other users such that such information cannot subsequently be associated with or otherwise used to identify an individual user.

Figure 6:
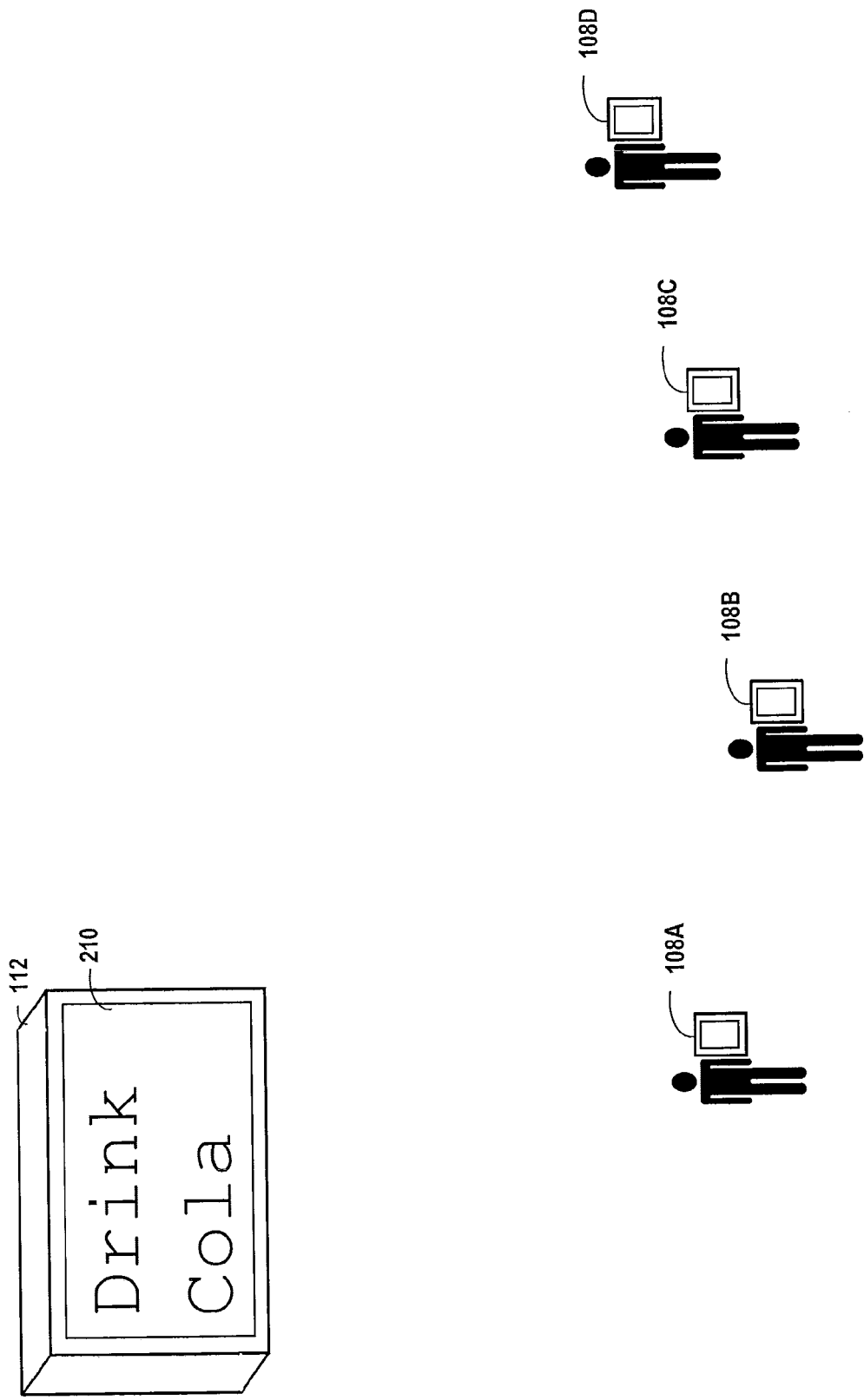
FIG. 6 depicts several users, each having a user device, present relatively further away from a content presentation medium.

By way of further illustration, FIG. 6 depicts the presence of several users, each having a user device 108, present relatively further away from advertising medium 112 (as compared to the proximity of the users shown in FIG. 5). It can be appreciated that, in light of the greater distance between the users and advertising medium 112, such users are likely to have a relatively more difficult time viewing/reading content presented at advertising medium 112. As such, the advertisement selected for presentation (such as in the manner described at 350), can be further configured/formatted to account for such distance. For example, as shown in FIG. 6, the ad 210 selected for presentation at ad advertising medium 112 can be formatted to account for the greater distance between the various users and advertising medium 112— such as by increasing the font size used in the text of the ad, increasing the size of additional visual content (e.g., pictures) or removing such content entirely, and/or removing additional content, such as additional text that cannot be appreciated by users who are relatively further away from advertising medium 112.

Figure 7:
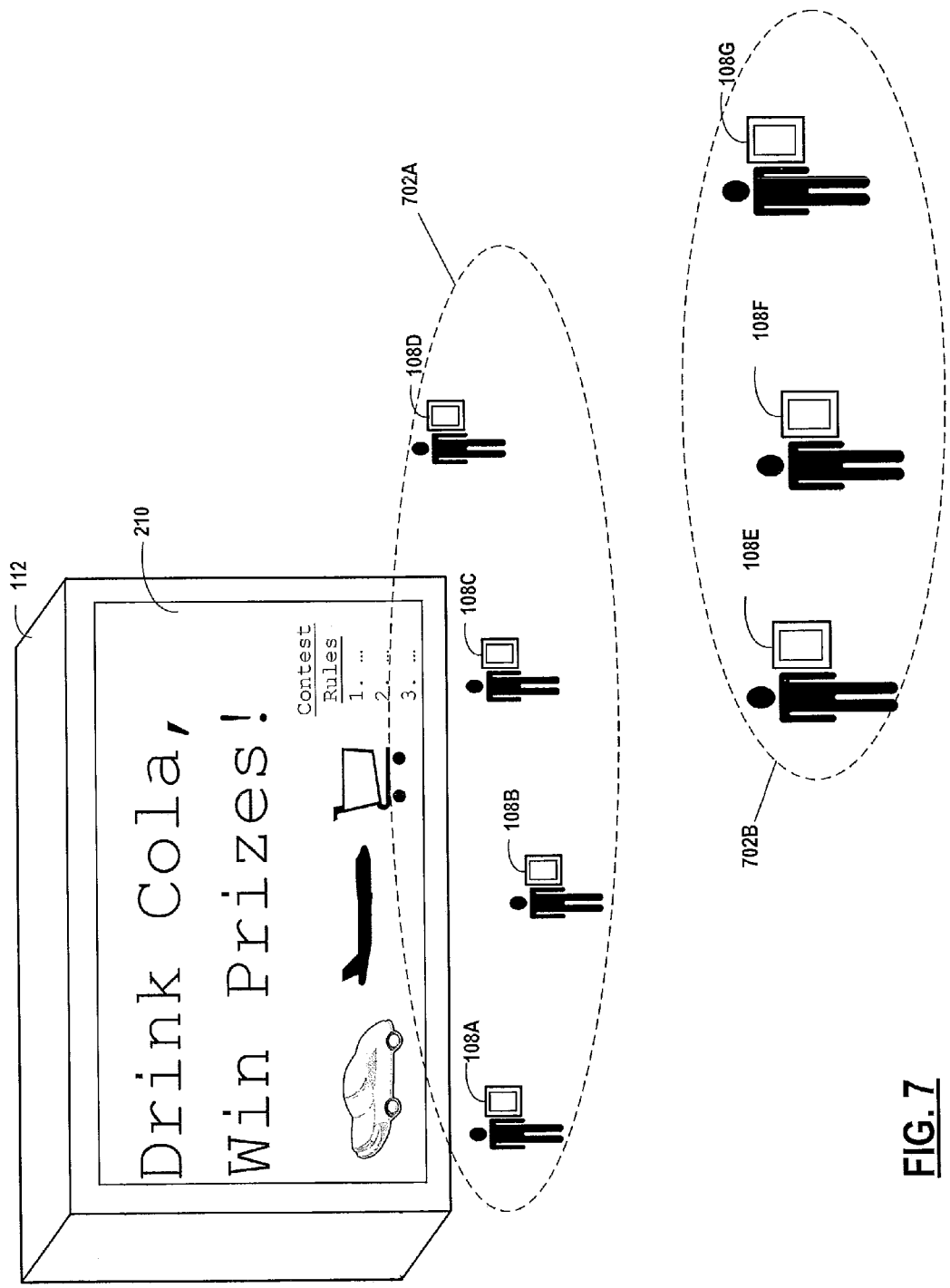
FIG. 7 depicts the presence of two groups of users, with one group being present in relatively closer proximity to content presentation medium and the other group being present relatively further away from content presentation medium.

Moreover, in certain implementations, certain aspects of the one or more third party content items, such as advertisements, can be formatted in a manner that accounts for: (a) a proximity of certain devices to the content presentation medium and/or (b) certain characteristics, while other aspects of the one or more third party content items, such as advertisements, can be formatted in a manner that accounts for: (a) a proximity of other devices to the content presentation medium and/or (b) other characteristics. That is, it can be appreciated with reference to FIGS. 5 and 6 that an advertisement can configured/formatted in certain ways to account for the relatively close proximity of certain users to the advertising medium on which the advertisement is presented, while such an advertisement can be configured/formatted in other ways to account for greater distance between users and the advertising medium. Accordingly, in scenarios where users are present both in close proximity to and further away from an advertising medium, it can be advantageous to configure/format an advertisement being presented on such an advertising medium to account for both the close proximity of certain users (as well as the characteristics of those users), and the greater distance of other users (and the characteristics of those users). By way of illustration, FIG. 7 depicts the presence of two groups of users 702A and 702B (with each user having a user device 108), with group 702A being present in relatively closer proximity to advertising medium 112 and group 702B being present relatively further away from advertising medium 112. Accordingly, the advertisement selected for presentation (such as in the manner described at 350), can be further configured/formatted to account for both the close proximity of some users to the advertising medium and the relatively greater distance of other users from the same advertising medium. Thus, for example, as shown in FIG. 7, certain aspects of the ad 210 selected for presentation at advertising medium 112 can be formatted to account for the greater distance between the various users and advertising medium 112—such as by increasing the font size used in the text of the ad, while other aspects of the same ad can be formatted to account for the relatively close proximity of the other users—such as by adding additional content, such as additional text that can only be appreciated by users who are in relatively close proximity to advertising medium 112. It can be appreciated that, in doing so, a single advertisement can be configured in a manner that accounts for both the relatively close proximity of some users to the advertising medium, while also accounting for the relatively greater distance of other users to the advertising medium.

Figure 8:
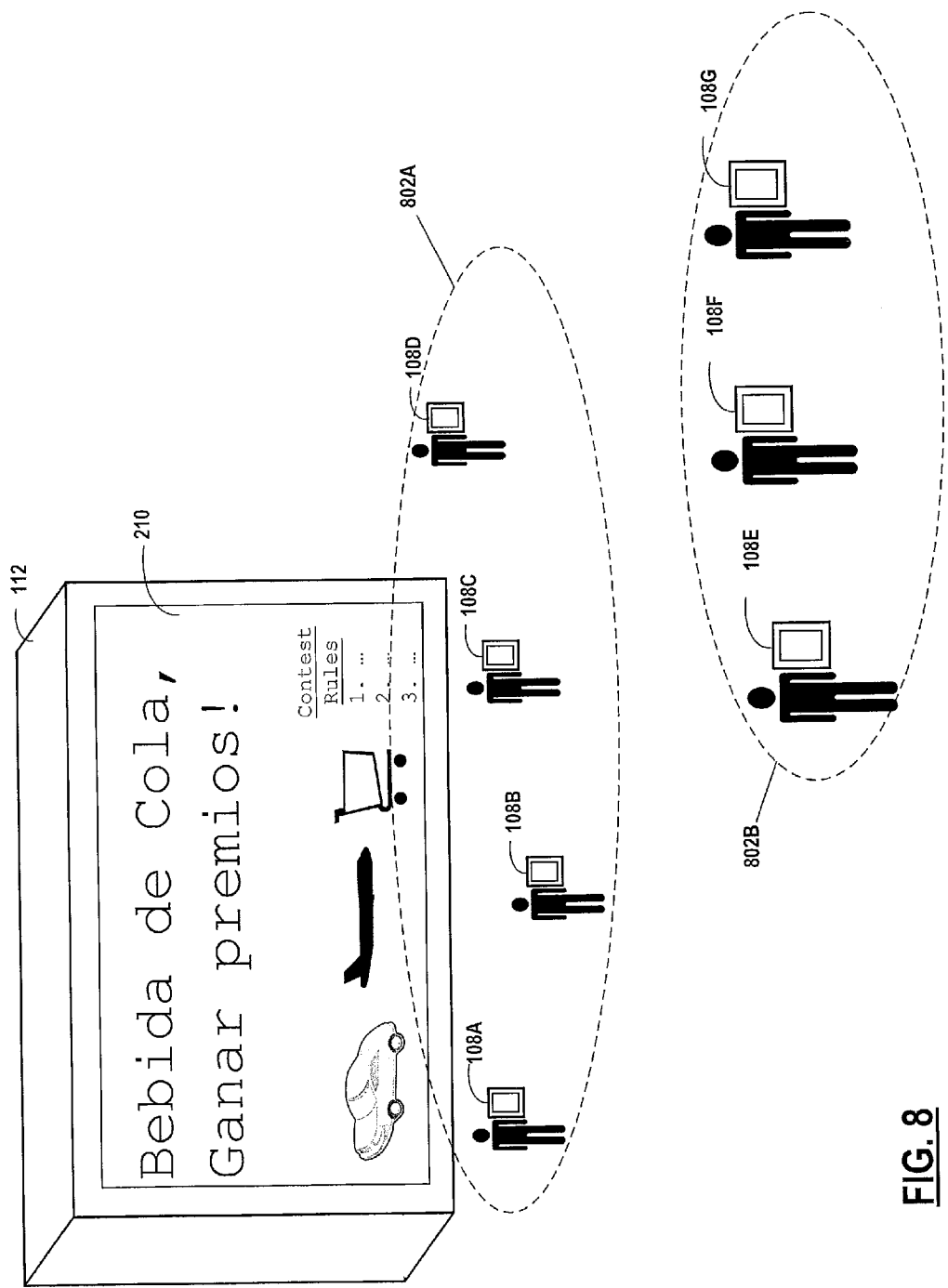
FIG. 8 depicts the presence of two groups of users, with one group being present in relatively closer proximity to content presentation medium and the other group being present relatively further away from content presentation medium.

By way of yet further illustration, FIG. 8 depicts the presence of two groups of users 802A and 802B (with each user having a user device 108), with group 802A being present in relatively closer proximity to advertising medium 112 and group 802B being present relatively further away from advertising medium 112. It should be further noted that several of the members of group 802B share the characteristic of being native Spanish speakers, while several of the members of group 802A share the characteristic of being native English speakers. Accordingly, in addition to formatting ad 210 to account for the relative proximity/distance of the respective groups of users (as described in relation to FIG. 7), the advertisement selected for presentation (such as in the manner described at 350), can be further configured/formatted to account for the respective characteristics, such as the language preferences, of the users of the respective groups. Thus, for example, as shown in FIG. 8, certain aspects of the ad 210 selected for presentation at advertising medium 112 can be configured to account for the characteristics of one group—such as by presenting the large text (which is intended to be viewable by the users in group 802B who are relative further away from advertising medium 112) in Spanish, while configuring other aspects of ad 210 to account for the characteristics of another group—such as by presenting other aspects of the same ad, such as additional text that can only be appreciated by users in relatively close proximity to advertising medium, in English. It can be appreciated that, in doing so, in addition to accounting for the relative proximities of various users, a single advertisement can be configured in a manner that accounts for different characteristics of different users (e.g., linguistic differences), thereby providing a single ad that can be simultaneously appreciated by different types of users.

At this juncture, it should be noted that each of the examples/illustrations provided herein, such as those described with respect to FIGS. 4-8, are merely exemplary. Accordingly, many other implementations are similarly contemplated. For example, a single ad 210 can be configured based on characteristics, such as interests, shared by various users that are determined to be within proximity (whether close or far) of advertising medium 112. By way of illustration, having determined that several users have an interest in sports or movies, an ad can be configured to incorporate a celebrity endorser (e.g., a sports star or movie star) that reflects such a common interest.

One or more third party content items are presented (370). In certain implementations, the third party content items are presented at the content presentation medium as configured for presentation, such as in the manner described at 360.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 9:
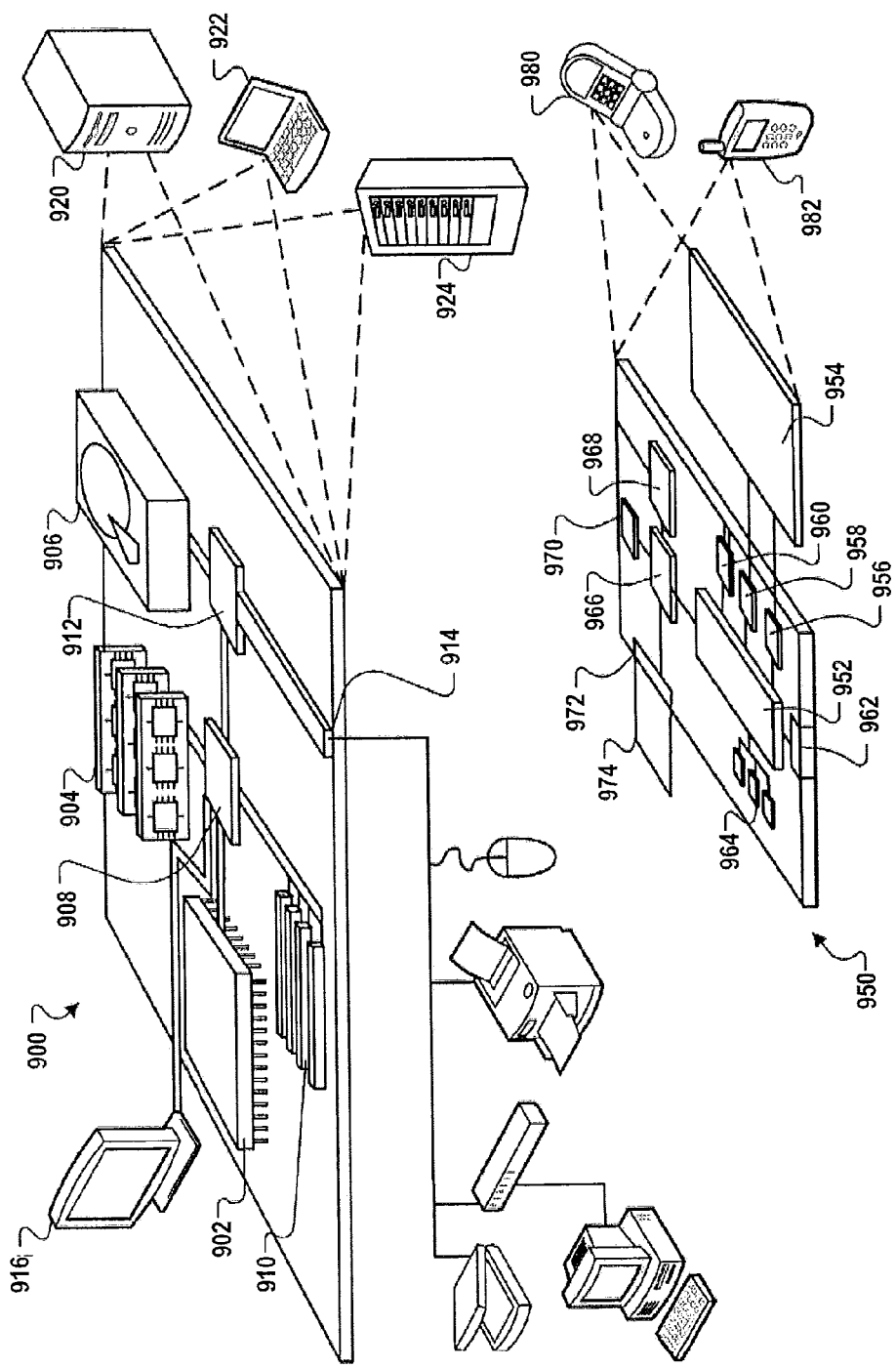
FIG. 9 shows an example of a computing device and a mobile computing device that can be used in connection with computer-implemented methods and systems described in the present specification.

FIG. 9 shows an example of a computing device 900 and a mobile computing device that can be used to implement the techniques described herein the present specification. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a microdrive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also.

Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for providing third party content, the method comprising:
   receiving a plurality of respective identifiers, each respective identifier being associated with a respective one of a plurality of devices;
   determining a respective proximity of each of the respective devices to a content presentation medium;
   processing, with a processor executing code, the respective proximities of the devices to the content presentation medium to identify two or more respective groups of the respective devices;
   processing, with the processor executing code, the respective identifiers to determine one or more characteristics, the one or more characteristics pertaining to users of the respective devices within each of the respective groups;
   selecting, based on one of the identified groups and at least a portion of the one or more characteristics pertaining to users of the respective devices within said one of the identified groups, one or more third party content items that satisfy criteria associated with an ad for users of the respective devices within said one of the identified groups;
   configuring, based on (a) the respective proximities of the one or more devices within said one of the identified groups to the content presentation medium and (b) the one or more characteristics pertaining to users of the respective devices within said one of the identified groups, the one or more third party content items for presentation at the content presentation medium; and
   presenting the one or more third party content items at the content presentation medium while the devices of said one of the identified groups remain in closer proximity to the content presentation medium than a remainder of the identified groups.

2. The method of claim 1, wherein receiving the identifiers comprises receiving service set identifiers (SSIDs), each of the one or more SSIDs being broadcast by at least one of the devices.

3. The method of claim 2, wherein determining the respective proximities of devices to the content presentation medium is based on respective signal strengths of one or more SSIDs as received at the content presentation medium.

4. The method of claim 1, wherein determining the respective proximity of each of the respective devices to the content presentation medium comprises determining one or more respective proximities of one or more devices to a content presentation medium based on at least one of: (a) respective signal strengths associated with one or more media access control (MAC) addresses, (b) respective signal strengths of one or more Bluetooth identifiers, (c) respective signal strengths of one or more near-field communications (NFC) identifiers, and (d) one or more GPS coordinates of one or more of the devices.

5. The method of claim 1, wherein each respective identifier corresponds to a respective user profile.

6. The method of claim 5, wherein processing the respective identifiers comprises processing a respective user profile to determine the one or more characteristics.

7. The method of claim 1, wherein selecting one or more third party content items further comprises selecting one or more third party content items that are focused towards users having at least one of the one or more characteristics.

8. The method of claim 1, further comprising computing, based on the one or more characteristics, an effectiveness of the one or more third party content items.

9. The method of claim 8, wherein selecting one or more third party content items is based on the effectiveness.

10. The method of claim 1, wherein configuring the one or more third party content items for presentation at the content presentation medium comprises formatting the one or more third party content items in a manner that accounts for the one or more proximities of the devices in said one identified group.

11. The method of claim 1, wherein configuring the one or more third party content items for presentation at the content presentation medium comprises:
   formatting, with a processor executing code, a first aspect of the one or more third party content items in a manner that accounts for (a) a first proximity to the content presentation medium of a first group of the two or more respective groups and (b) one or more characteristics shared by the users of the respective devices within the first group;

formatting, with a processor executing code, a second aspect of the one or more third party content items in a manner that accounts for (a) a second proximity to the content presentation medium of a second group of the two or more respective groups and (b) one or second characteristics shared by the users of the respective devices within the second group; and presenting, with a processor executing code, the formatted first aspect and the formatted second aspect simultaneously at the content presentation medium.

12. A system comprising: one or more processors configured to interact with a computer-readable medium in order to perform operations comprising:

receiving a plurality of respective identifiers, each respective identifier being associated with a respective one of a plurality of devices;

determining a respective proximity of each of the respective devices to a content presentation medium;

processing the respective proximities of the devices to the content presentation medium to identify two or more respective groups of the respective devices;

processing the respective identifiers to determine one or more characteristics, the one or more characteristics pertaining to users of the respective devices within each of the respective groups;

selecting, based on one of the identified groups and at least a portion of the one or more characteristics pertaining to users of the respective devices within said one of the identified groups, one or more third party content items that satisfy criteria associated with an ad for users of the respective devices within said one of the identified groups;

configuring, based on (a) the respective proximities of the one or more devices within said one of the identified groups to the content presentation medium and (b) the one or more characteristics pertaining to users of the respective devices within said one of the identified groups, the one or more third party content items for presentation at the content presentation medium; and presenting the one or more third party content items at the content presentation medium while the devices of said one of the identified groups remain in closer proximity to the content presentation medium than a remainder of the identified groups.

13. The system of claim 12, wherein receiving the respective identifiers comprises receiving service set identifiers (SSIDs), each of the one or more SSIDs being broadcast by at least one of the devices.

14. The system of claim 13, wherein determining the respective proximities of devices to the content presentation medium is based on respective signal strengths of one or more SSIDs as received at the content presentation medium.

15. The system of claim 12, wherein determining the respective proximity of each of the respective devices to the content presentation medium comprises determining one or more respective proximities of one or more devices to a content presentation medium based on at least one of: (a) respective signal strengths associated with one or more media access control (MAC) addresses, (b) respective signal strengths of one or more Bluetooth identifiers, (c) respective signal strengths of one or more near-field communications (NFC) identifiers, and (d) one or more GPS coordinates of one or more of the devices.

16. The system of claim 12, wherein each respective identifier corresponds to a respective user profile.

17. The system of claim 16, wherein processing the respective identifiers comprises processing a respective user profile to determine the one or more characteristics.

18. The system of claim 12, wherein selecting one or more third party content items further comprises selecting one or more third party content items that are focused towards users having at least one of the one or more characteristics.

19. The system of claim 12, further configured to perform operations comprising computing, based on the one or more characteristics, an effectiveness of the one or more third party content items.

20. The system of claim 19, wherein selecting one or more third party content items is based on the effectiveness.

21. The system of claim 12, wherein configuring the one or more third party content items for presentation at the content presentation medium comprises formatting the one or more third party content items in a manner that accounts for the one or more proximities of the devices in said one identified group.

22. The system of claim 12, wherein configuring the one or more third party content items for presentation at the content presentation medium comprises:

formatting, with a processor executing code, a first aspect of the one or more third party content items in a manner that accounts for (a) a first proximity of to the content presentation medium of a first group of the two or more respective groups and (b) one or more characteristics shared by the users of the respective devices within the first group;

formatting, with a processor executing code, a second aspect of the one or more third party content items in a manner that accounts (a) a second proximity to the content presentation medium of a second group of the two or more respective groups and (b) one or more characteristics shared by the users of the respective devices within the second group; and presenting, with a processor executing code, the formatted first aspect and the formatted second aspect simultaneously at the content presentation medium.

23. A computer storage medium encoded with a computer program, the program comprising instructions that when executed by a data processing apparatus cause the data processing apparatus to perform operations comprising:

receiving a plurality of respective identifiers, each respective identifier being associated with a respective one of a plurality of devices;

determining a respective proximity of each of the respective devices to a content presentation medium;

processing the respective proximities of the devices to the content presentation medium to identify two or more respective groups of the respective devices;

processing the respective identifiers to determine one or more characteristics, the one or more characteristics pertaining to users of the respective devices within each of the respective groups;

selecting, based on one of the identified groups and at least a portion of the one or more characteristics pertaining to users of the respective devices within said one of the identified groups, one or more third party content items that satisfy criteria associated with an ad for users of the respective devices within said one of the identified groups;

configuring, based on (a) the respective proximities of the one or more devices within said one of the identified groups to the content presentation medium and (b) the one or more characteristics pertaining to users of the respective devices within said one of the identified groups, the one or more third party content items for presentation at the content presentation medium; and presenting the one or more third party content items at the content presentation medium while the devices of said one of the identified groups remain in closer proximity to the content presentation medium than a remainder of the identified groups.

* * * * *